(12) United States Patent
Shiratori et al.

(10) Patent No.: US 7,667,791 B2
(45) Date of Patent: Feb. 23, 2010

(54) ULTRAVIOLET ABSORBING GLASS, GLASS TUBE FOR FLUORESCENT LAMP USING SAME, AND METHOD FOR PRODUCING ULTRAVIOLET ABSORBING GLASS FOR FLUORESCENT LAMP

(75) Inventors: Makoto Shiratori, Haibara-gun (JP); Kazuhito Nakano, Haibara-gun (JP)

(73) Assignee: Asahi Techno Glass Corporation, Funabashi-shi (JP)

( * ) Notice: Subject to any disclaimer, the term of this patent is extended or adjusted under 35 U.S.C. 154(b) by 259 days.

(21) Appl. No.: 11/908,417

(22) PCT Filed: Mar. 16, 2006

(86) PCT No.: PCT/JP2006/305219

§ 371 (c)(1), (2), (4) Date: Sep. 12, 2007

(87) PCT Pub. No.: WO2006/103942

PCT Pub. Date: Oct. 5, 2006

(65) Prior Publication Data

US 2009/0009691 A1    Jan. 8, 2009

(30) Foreign Application Priority Data

Mar. 25, 2005 (JP) ............................. 2005-088476
Jan. 18, 2006 (JP) ............................. 2006-009628

(51) Int. Cl.
*G02F 1/1335* (2006.01)
(52) U.S. Cl. ......................................................... 349/70
(58) Field of Classification Search ................... 349/70
See application file for complete search history.

(56) References Cited

FOREIGN PATENT DOCUMENTS

| JP | 9 110467 | 4/1997 |
|---|---|---|
| JP | 2001 278636 | 10/2001 |
| JP | 2002 29778 | 1/2002 |
| JP | 2002 60245 | 2/2002 |
| JP | 2002 187734 | 7/2002 |
| JP | 2002 293571 | 10/2002 |
| JP | 2004 91308 | 3/2004 |

*Primary Examiner*—David Nelms
*Assistant Examiner*—Phu Vu
(74) *Attorney, Agent, or Firm*—Oblon, Spivak, McClelland, Maier & Neustadt, L.L.P.

(57) ABSTRACT

Disclosed is an ultraviolet absorbing glass for fluorescent lamps which is composed of a borosilicate glass containing, in mass %, 60 to 80% of $SiO_2$, 1 to 7% of $Al_2O_3$, 10 to 25% of $B_2O_3$, 3 to 15% of $Li_2O+Na_2O+K_2O$, 0 to 5% of $CaO+MgO+BaO+SrO+ZnO$, 0.001 to 0.05% of $Fe_2O_3$, 0.1 to 5% of $CeO_2$, 0.01 to 5% of $SnO+SnO_2$ and 0.01 to 5% of $ZrO_2+ZnO+Nb_2O_5$, and having an average linear expansion coefficient in a range of 36 to $57 \times 10^{-7}/°$ C. at 0 to 300° C. defined in JIS R 3102.

10 Claims, No Drawings

ULTRAVIOLET ABSORBING GLASS, GLASS TUBE FOR FLUORESCENT LAMP USING SAME, AND METHOD FOR PRODUCING ULTRAVIOLET ABSORBING GLASS FOR FLUORESCENT LAMP

TECHNICAL FIELD

The present invention relates to an ultraviolet absorbing glass, a glass suitable for an enclosure of a light source involving ultraviolet radiation, and particularly for a fluorescent lamp used for the back light of a display device such as a liquid crystal display (hereinafter may also be referred to as the LCD), a glass tube for fluorescent lamps using the glass, and a method for producing an ultraviolet absorbing glass for fluorescent lamps.

BACKGROUND ART

The liquid crystal display (hereinafter may also be referred to as the LCD) is being used extensively as a main device of multimedia-related devices in recent years, but with the expansion of its use, there are demands for weight reduction, thickness reduction, reduction of power consumption, provision of high luminance and cost reduction. Among the LCDS, a high-definition display device is required for displays for personal computers, vehicle-mounting displays, TV monitors and the like. Meanwhile, since a liquid crystal display element itself does not emit light, a transmission type liquid crystal display element using a back light having a fluorescent lamp as a light source is used for the above-described usage. And, for devices using a reflection type liquid crystal display element, a front light is used as a light source for emitting light from the front.

With the trend toward the weight reduction, thickness reduction, provision of high luminance and reduction of power consumption of the LCD, the fluorescent lamp for the back light is also under progress for provision of a narrow tube and a small wall thickness. The provision of a narrow tube and a small wall thickness of the fluorescent lamp degrades a mechanical strength, and the improvement of a luminous efficiency tends to increase the heating value of the lamp. Therefore, a glass having a higher mechanical strength and heat resistance is being required.

Under the circumstances described above, in order to provide a higher strength and heat resistance compared to a conventionally used lead-soda soft glass, a fluorescent lamp using a borosilicate hard glass has been developed and put on the market. A kovar alloy or tungsten has been used for the enclosed wires of electrodes, and a low expansion borosilicate glass sealable airtight with such a metal has been developed. The "kovar" used here is a trademark (trade name) indicating an Fe—Ni—Co alloy of Westinghouse Ele. Corp., and it is used in a sense including the equivalent products of other companies, such as a KOV (brand name) produced by Toshiba Corporation.

The low expansion borosilicate glass is diverted from a glass generally used for the conventional xenon flash lamps. In a case where the glass is used for the xenon flash lamps, it is designed such that a certain level of ultraviolet rays is allowed to pass through it so as to resist the flash of light of the lamp. But, in a case where the glass is used for the fluorescent lamps, it is necessary to consider measures to prevent leakage of ultraviolet rays and discoloration of the glass by radiation of ultraviolet rays produced within the lamp, so-called ultraviolet solarization, and a glass to which a small amount of components for improving such properties is added is being used.

The glass disclosed in Patent Reference 1 or Patent Reference 2 is a typical example of a glass for the above-described usage, and it has a composition with the resistance to ultraviolet solarization of the glass improved by containing any of $TiO_2$, PbO and $Sb_2O_3$ with a borosilicate glass used as a base. And, the glass disclosed in Patent Reference 3 or Patent Reference 4 has a composition with the ultraviolet transmittance of 253.7 nm, which is a resonance line of mercury, suppressed to a low level by further adding $Fe_2O_3$ and $CeO_2$.

In mass production, the glass tube is produced by an up drawing method, a Vello process, a Danner method and the like, but since the glass tube used for the back light is a thin tube and required to have high dimensional accuracy, the Danner method is optimum.

Patent Reference 1: JP-A 9-110467 (KOKAI)
Patent Reference 2: JP-A 2002-187734 (KOKAI)
Patent Reference 3: JP-A 2002-293571 (KOKAI)
Patent Reference 4: JP-A 2004-91308 (KOKAI)

DISCLOSURE OF THE INVENTION

The properties of a fluorescent lamp used for lighting such as a liquid crystal display element or the like, especially a back light used for a large liquid crystal TV, a monitor with TV and the like in recent years, are required to be higher than before in terms of the following items with the increased number of lamps per unit and the increased length of the lamps.

The fluorescent lamps for a back light have the same light emission principle as that of the lamps for general lighting, mercury vapor excited by discharge between electrodes emits ultraviolet rays, and a fluorescent substance applied on the inner wall of the tube receives ultraviolet rays and emits visible light. Within the lamps, 253.7 nm ultraviolet rays are mainly generated and mostly converted to visible light but partly not converted to visible light by the fluorescent substance to possibly reach the glass.

Within the fluorescent lamps, ultraviolet rays of 297, 313, 334 and 366 nm are present other than 253.7 nm though the emission intensity is low in comparison with it. Therefore, it is necessary to consider blocking of the ultraviolet rays of the above wavelengths.

The back light for the liquid crystal TV has several to ten or more fluorescent lamps for each unit, so that a total ultraviolet emission amount increases inevitably.

To improve the luminance demanded for the back light unit used mainly for the liquid crystal TV, the properties of the lamp itself are naturally modified, and resin materials for a light guide plate and a reflection mirror are also modified with emphasis on them. Resins such as polyester, polystyrene, polypropylene, polycarbonate film, cycloolefin polymer and the like used for the light guide plate and the reflection mirror cannot have sufficient ultraviolet resistance and particularly have a degraded wavelength in the vicinity of 300 to 330 nm. Therefore, their exposure to ultraviolet rays having the above wavelength results in causing degradation in display quality as a back light unit, a product life and reliability. Accordingly, it is now required to take measures such that the ultraviolet rays of the above-described wavelength ranges are also absorbed by the glass to prevent their radiation to the outside of the lamp.

In a case where a conventional borosilicate glass is used for the outer tube of a fluorescent lamp for a back light, $Al_2O_3$, $TiO_2$ or ZnO which is a component for reflecting or absorbing ultraviolet rays is coated on the inside wall of the glass tube, and a fluorescent substance is coated thereon to form a multilayer film, thereby lowering the intensity of ultraviolet rays reaching the glass. But, such a method cannot avoid a difficulty of coating due to the provision of a narrow tube and the increased length of the glass tube and an increase in cost due to the addition of the coating process.

In addition, it is known well that the demand for a property excelling in ultraviolet solarization resistance and the conformity of the thermal expansion coefficient of the glass tube with the introduced metal are necessary items to keep the properties of the glass tube for a back light.

The glass disclosed in the above-described Patent Reference 1 has the ultraviolet solarization resistance and a sufficient blocking effect against ultraviolet rays of 253.7 nm, but consideration of blocking 315-nm ultraviolet rays corresponding to deterioration of the resin used for the back light unit is not given sufficiently, and there is a possibility that the inside resin is deteriorated during a long-term use.

The ultraviolet blocking properties of the glasses disclosed in the above-described Patent References 2, 3 and 4 are adjusted by combining $WO_3$, $ZrO_2$, $SnO_2$, $Fe_2O_3$ and $CeO_2$. But these properties does not satisfy both the 315-nm ultraviolet blocking property and devitrification by secondary fabrication to a necessary and sufficient level, and there are problems that $Fe_2O_3$, $CeO_2$ and $TiO_2$ have a tendency to enhance coloring to one another, a 315 nm absorption property depends on a melting state of the glass, and an ultraviolet absorption end is not stabilized. Especially, a $CeO_2$-containing glass tends to cause absorption in a visible region, so that it is not suitable for the liquid crystal TVs which are demanded to have sufficient brightness and color reproducibility.

The present invention has been made under the circumstances described above and provides a glass suitable for a glass tube to be used for fluorescent lamps for a back light which particularly excels in blocking of harmful ultraviolet rays of a wavelength of 315 nm or less, which effect on the deterioration of the resin, and has sufficient ultraviolet solarization resistance for fluorescent lamp use.

According to an aspect of the present invention, there is provided an ultraviolet absorbing glass for fluorescent lamps, which is composed of a borosilicate glass containing, in mass %, 0.001 to 0.05% of $Fe_2O_3$, 0.1 to 5% of $CeO_2$, 0.01 to 5% of $SnO+SnO_2$ and 0.01 to 5% of $ZrO_2+ZnO+Nb_2O_5$ and having an average linear expansion coefficient in a range of 36 to $57 \times 10^{-7}/°$ C. at 0 to 300° C. defined in JIS (Japanese Industrial Standards) R 3102, and which has a transmittance of 10% or less at a wavelength of 315 nm when a thickness is 0.3 mm and a degree of deterioration of 5% or less according to the following ultraviolet radiation test, wherein the degree of deterioration according to the ultraviolet radiation test is determined by positioning a glass, of which both sides having been optically polished so as to have a mirror surface and a thickness of 1 mm, at a distance of 20 cm with the polished surface faced to a 400 W high-pressure mercury lamp having a wavelength of 253.7 nm, exposing it to ultraviolet radiation for 300 hours, measuring a transmittance ($T_1$) at a wavelength of 400 nm, and determining a degree of deterioration from an initial transmittance ($T_0$) at a wavelength of 400 nm before the ultraviolet radiation by the following equation:

the degree of deterioration (%)=$[(T_0-T_1)/T_0] \times 100$.

The borosilicate glass contains, in mass %, 60 to 80% of $SiO_2$, 1 to 7% of $Al_2O_3$, 10 to 25% of $B_2O_3$, 3 to 15% of $Li_2O+Na_2O+K_2O$ and 0 to 5% of $CaO+MgO+BaO+SrO$.

Another aspect of the present invention can form the above-described ultraviolet absorbing glass for fluorescent lamps into a tubular shape. And, it is desirable that the glass tube has an outside diameter of 0.7 to 6 mm and a wall thickness of 0.07 to 0.7 mm and it is used for a back light source of a liquid crystal display device.

Still another aspect of the invention is a method for producing an ultraviolet absorbing glass for fluorescent lamps, which is composed of a borosilicate glass containing, in mass %, 0.001 to 0.05% of $Fe_2O_3$, 0.1 to 5% of $CeO_2$, 0.01 to 5% of $SnO+SnO_2$ and 0.01 to 5% of $ZrO_2+ZnO+Nb_2O_5$ by using a divalent chemical material as an Sn source and reductively melting glass materials. The borosilicate glass here is preferably a glass containing 60 to 80% of $SiO_2$, 1 to 7% of $Al_2O_3$, 10 to 25% of $B_2O_3$, 3 to 15% of $Li_2O+Na_2O+K_2O$ and 0 to 5% of $CaO+MgO+BaO+SrO$ described above.

Still another aspect of the invention is a method for producing an ultraviolet absorbing glass for fluorescent lamps, which is made of a borosilicate glass containing, in mass %, 0.001 to 0.05% of $Fe_2O_3$, 0.1 to 5% of $CeO_2$ and 0.01 to 5% of $ZrO_2+ZnO+Nb_2O_5$ by reductively melting glass materials. The borosilicate glass here is preferably a glass containing 60 to 80% of $SiO_2$, 1 to 7% of $Al_2O_3$, 10 to 25% of $B_2O_3$, 3 to 15% of $Li_2O+Na_2O+K_2O$ and 0 to 5% of $CaO+MgO+BaO+Sro$ described above.

A glass for fluorescent lamps according to an aspect of the invention has a thermal expansion coefficient suitable for sealing with kovar and tungsten and also has excellent ultraviolet solarization resistance, so that it is suitable as a glass tube for fluorescent lamps, and particularly as a glass tube used for fluorescent lamps for a back light of a display device such as a liquid crystal display.

A glass according to an aspect of the invention also has an excellent ultraviolet blocking property at 315 nm, so that even when it is used for fluorescent lamps for a back light of a display device such as a liquid crystal display, it does not deteriorate materials such as resin parts within the display device but improves the reliability of the display device.

In addition, a glass tube for fluorescent lamps produced using the glass according to an aspect of the invention has high ultraviolet solarization resistance and can prevent the degradation in display quality of a liquid crystal display or the like due to a discoloration of the glass.

BEST MODE FOR CARRYING OUT THE INVENTION

The present invention has achieved the above-described objects by configuring as described above, and the reasons of the above-described restriction of the contents of the individual components configuring the glass according to the present invention will be described below.

$Fe_2O_3$ is a component for strongly absorbing ultraviolet rays and inevitable for an embodiment of the invention, which can be expected to provide an ultraviolet blocking effect when added in a small amount, but its effect cannot be expected if its added amount is less than 0.001% in mass %. If its addition exceeds 0.05%, the ultraviolet solarization resistance is adversely effected. It is preferably added in 0.003 to 0.04%, and more preferably, in 0.005 to 0.03%.

$CeO_2$ is a component for strongly absorbing ultraviolet rays and inevitable for an embodiment of the invention, but its ultraviolet blocking effect is lost if its added amount is less than 0.1% in mass %, and it is not desirable if the added amount exceeds 5%, because devitrification becomes high. Since $CeO_2$ has a high oxidizing power, it is reduced to readily fall in a trivalent state but generally coexists in states of $Ce^{3+}$ and $Ce^{4+}$ within the glass, and $Ce^{3+}$ and $Ce^{4+}$ each have an absorption band at 316 nm and 243 nm, respectively. $Ce^{3+}$ shows sharp absorption, while $Ce^{4+}$ shows broad absorption reaching a visible range, so that if the added amount is increased, the glass is colored to yellowish brown. To efficiently absorb ultraviolet rays of 315 nm or less by a colorless glass which does not absorb a visible range, it is necessary to increase a ratio of $Ce^{3+}$, and in a case where $CeO_2$ is used, it is desirable that the glass is reductively melted.

$SnO+SnO_2$ is a component necessary for control of the valence of Ce ions. Sn ions are present in a divalent or quadrivalent state within the glass. Where it is coexisted with $CeO_2$, the Sn ions are fallen in a quadrivalent state by the oxidizing power of $CeO_2$, and the Ce ions are reduced to easily fall in a trivalent state, so that ultraviolet rays can be absorbed efficiently. Sn is desirably used as a divalent compound such as SnO, but since it is oxidized within the glass to have a form of $SnO_2$, it is indicated as $SnO+SnO_2$. Sn works as an effective reducing agent when it is used as a divalent compound. As the reducing agent, an organic material such as carbon can also be used. But, an organic reducing agent becomes a gaseous state when worked as a reducing agent and vaporizes from the glass in a melting process so not to remain in a final product. After the organic reducing agent is decomposed and vaporized in the melting process, the redox state of the glass depends on a melting atmosphere, and it is hard to maintain a reducing property if the glass is kept in a tank furnace for a long period. SnO remains as a glass component and also has an effect of stabilizing the valence of ions in the glass, so that $SnO+SnO_2$ is determined to be an essential component in one embodiment of the invention. When $SnO+SnO_2$ is less than 0.01% in their total amount, a ratio of $Ce^{4+}$ increases, the glass is colored to yellowish brown, and the transmittance in the visible range is lowered. And, if it exceeds 5%, it is not desirable because the tendency of devitrification of the glass becomes high. And, $SnO+SnO_2$ has an effect of absorbing ultraviolet rays in addition to the effect of controlling the valence of Ce ions. When reduced, the Ce ions have $Ce^{3+}$ increased and $Ce^{4+}$ decreased. Here, $SnO+SnO_2$ coexists in a state of $Sn^{2+}$ and $Sn^{4+}$ in the glass, and $Sn^{2+}$ has an absorption band in the vicinity of 240 nm. Therefore, the degradation of an absorption property of ultraviolet rays of 253.7 nm due to the reduction of $Ce^{4+}$ can be compensated by $Sn^{2+}$.

A production method in which $SnO+SnO_2$ is added to perform melting reductively is a main feature of one embodiment of the invention, but a composition not containing SnO can be made reductive by using different means. Specifically, it is considered that an organic reducing agent such as carbon and sucrose or an ammonium salt is added to the material or a melting atmosphere is controlled. By melting reductively, the valence of Ce ions can be put into a $Ce^{3+}$ state. It is also possible to substitute $SnO+SnO_2$ partly by the above-described reducing agent to use together. But, when the organic reducing agent is used, it is disadvantageous for the stabilization of the valence of ions as described above, and it is necessary to pay attention to conditions such as an increase of the added amount. Especially, when the ratio of $Ce^{4+}$ ions is increased, the glass is colored to yellowish brown, and a transmittance of 400 nm lowers, so that it is significant to maintain a reducing property. Coloration of the glass is evaluated with the transmittance of a sample polished to have a wall thickness of 1 mm at a wavelength of 400 nm used as a measure. If the evaluated value is 88% or more, preferably 89% or more, and more preferably 90% or more, the coloration of the glass can be hardly recognized visually, and the brightness of the fluorescent lamp is not influenced.

By increasing the ratio of $Ce^{3+}$ by adding SnO or performing reducing melting, an effective ultraviolet absorption property can be obtained, but it is hard to completely put the Ce ions into a trivalent state, and it is considered that they partly remain in a state of $Ce^{4+}$. $Ce^{4+}$ is also a yellow coloring component, so that the glass might be colored to have a light yellow color depending on the state of Ce ions. Excessive coloring is not desirable but light coloring can be dealt with by correction of the color. CoO, NiO, $Nd_2O_3$, $MnO_2$ or the like can be used for correction of the color, but such components are strong coloring agents, so that excessive addition is not desirable, and the upper limit is 1%.

$ZrO_2$, ZnO and $Nb_2O_5$ are components effective for improvement of the ultraviolet solarization resistance and are required, in mass %, in a total amount of 0.01% or more, but if the amount exceeds 5%, it is not desirable because devitrification becomes high. Those components may be added solely or in two or more of them, but where $Nb_2O_5$ is used, the upper limit of $Nb_2O_5$ is determined to be 0.2% in order to prevent the glass from being colored.

The glass is determined to have an average linear expansion coefficient in a range of 36 to $57 \times 10^{-7}/^\circ$ C. in order to have consistency of thermal expansion with kovar or tungsten as an electrode material and to improve a sealing property. A preferable range of each of the individual electrode materials is 36 to $46 \times 10^{-7}/^\circ$ C. for tungsten and 46 to $57 \times 10^{-7}/^\circ$ C. for kovar, and the sealing property is degraded if not in the above ranges.

As described above, when ultraviolet rays are radiated from the glass tube through it, deterioration of the materials such as resin parts within the LCD display device is accelerated, and the product life and reliability are degraded. Therefore, according to one embodiment of the invention, an ultraviolet blocking property is provided by the above-described components, and the glass is optically polished so as to have a thickness of 0.3 mm, thereby determining to have an ultraviolet transmittance of 10% or less at a wavelength of 315 nm. Thus, 313 nm ultraviolet rays which are radiated out of the tube can be suppressed to a low level by about 80% to 90% in comparison with a conventional glass.

The reasons of defining the degree of deterioration in the ultraviolet radiation test as described above in one embodiment of the invention are as follows. Generally, a coloring tendency (whether or not the glass is easily colored) in one to several hours can be confirmed by an acceleration test that the glass is exposed to the vicinity of a strong ultraviolet source. But, if the duration exceeds 100 hours, such a tendency becomes gentle gradually, and it can be confirmed that a state becomes substantially close to a coloring limit by solarization after the duration of 300 hours. Therefore, an influence of deterioration of transmittance when a real product is used for a long time of period can be grasped more accurately. The deterioration of transmittance due to the coloring by solarization is largest at an ultraviolet portion, and if this change is applied to a visible range, the brightness of the lamp is adversely effected. Especially, a spectral energy distribution of a blue-purple color of the fluorescent lamp is present in the vicinity of 400 nm, and it is considered that the brightness is influenced most by the transmittance deterioration due to the solarization. Therefore, the transmittance at a wavelength of 400 nm is determined to be an evaluation measure. If the degree of deterioration of the transmittance by the test under the above-described conditions is 5% or less, darkening of the LCD display due to the glass tube for the fluorescent lamps can be suppressed to a level that the user does not recognize it, and practical display quality can be maintained.

According to one embodiment of the invention, the above-described borosilicate glass contains, in mass %, 60 to 80% of $SiO_2$, 1 to 7% of $Al_2O_3$, 10 to 25% of $B_2O_3$, 3 to 15% of $Li_2O+Na_2O+K_2O$ and 0 to 5% of $CaO+MgO+BaO+SrO$. The reasons of limiting the contents of the individual components as described above will be described below.

$SiO_2$ is a network former of the glass, and if its content exceeds 80%, the meltability and formability of the glass are degraded. If it is less than 60%, the chemical durability of the glass is degraded. The degradation of the chemical durability causes weathering, fogging or the like, resulting in deterioration of the luminance of the fluorescent lamp and occurrence of irregular color. Its content is preferably 62 to 78%.

$Al_2O_3$ functions to improve devitrification and chemical durability of the glass, but if its content exceeds 7%, meltability is deteriorated because of formation of striae or the like. If its content is less than one percent, phase separation or devitrification tends to occur, and chemical durability of the glass is also degraded. Its content is preferably in a range of 2 to 5%.

$B_2O_3$ is a component used for improvement of meltability and adjustment of viscosity but has very high volatility, and if its content exceeds 25%, a homogeneous glass is hardly obtained. And, if its content is less than 10%, meltability is deteriorated. Its content is preferably 12 to 20%.

$Li_2O$, $Na_2O$ and $K_2O$ are components which function as melting agents to improve meltability of the glass and are used for adjustment of viscosity and thermal expansion coefficient, but such effects cannot be provided if their contents do not meet the above-described contents, and if their contents exceed the above-described upper limit value, the thermal expansion coefficient becomes excessively high, and the chemical durability is degraded. The contents of the individual components are desired such that $Li_2O$ is 0 to 3%, $Na_2O$ is 0 to 8% and $K_2O$ is 2 to 12% in mass %, but effects such as improvement of insulating property by mixed alkali can be expected by containing not one but two or three components. If the contents of the individual components exceed the above-described upper limit values, the thermal expansion coefficient becomes excessively high, or the chemical durability is degraded. And, it is known that $Na_2O$ reacts with mercury to form amalgam while the fluorescent lamp is lit, and $Na_2O$ excessively contained in the glass results in decreasing the amount of mercury effectively acting within the fluorescent lamp. Therefore, it is not desirable to add $Na_2O$ in an amount exceeding the above-described upper limit value in an environmental view of decreasing the used amount of mercury, and its more desirable amount is 0 to 4%. In a case where $Na_2O$ is used for a purpose of sealing with kovar metal, it is desirably 8 to 15%, and where it is used for a purpose of sealing with tungsten, it is desirably 3 to 10%. If the added amount is less than the respective lower limit values, an expansion coefficient lowers considerably, and a viscosity increases considerably, so that good sealing with a kovar alloy or tungsten can not be performed.

CaO, MgO, BaO and SrO are components having effects to decrease a viscosity of the glass at a high temperature and to improve meltability and can be added in a total amount of up to 5% if required. If the added amount exceeds the upper limit value, the glass state becomes instable, and devitrification tends to occur.

A fining agent used when a glass is melted in one embodiment of the invention is desirably a reducing and fining agent. One embodiment of the invention has a feature that a good ultraviolet absorption property can be obtained by controlling $CeO_2$ used as an ultraviolet absorbing agent to fall in a $Ce^{3+}$ ion state, and an oxidation fining agent is not desirable. Because of the same reason, use of a material working as an oxidizing agent must be avoided. Specifically, as a fining agent, NaCl or $Na_2SO_4+C$ is desirable, but $Sb_2O_3$ or $As_2O_3$ is not desirable. And, a nitrate of an alkaline component or the like must not be used.

When ultraviolet rays are radiated out of the glass tube through it as described above, the deterioration of the materials such as resin parts and the like within the LCD display device is accelerated, resulting in degrading the product life and reliability. Therefore, according to one embodiment of the invention, ultraviolet transmittance at a wavelength of 315 nm is determined to be 10% or less with the glass determined to have an ultraviolet blocking property by the above-described component composition and in a state having a thickness of 0.3 mm with being optically polished. If it is desired to provide a more desirable quality level without an influence on the transmission of visible light, the ultraviolet transmittance can be determined to be 1% or less with the glass thickness of 0.3 mm by adjusting very small amounts of components and the like.

The glass according to one embodiment of the invention can be produced as follows. First, materials are weighed and mixed so that the obtained glass has the above-described component range. The mixture of the materials is put in a quartz crucible or a platinum crucible and melted by heating in an electric furnace. After thoroughly stirring and fining, a desired shape is formed. In a case where a tubular shape is mass-produced in order to produce thin tubes for fluorescent lamps or the like according to another embodiment of the invention, the glass melted in a tank furnace can be formed without a problem by a forehearth using a platinum member and a glass supplying and forming mechanism according to a known tube drawing method such as Danner method, redrawing or the like.

The glass according to one embodiment of the invention will be described below in detail with reference to examples. Table 1 shows examples and comparative examples according to the present invention. Specimen Nos. 1 to 10 are examples of the invention, and Nos. 11 and 12 are comparative examples showing conventional glasses. The compositions in the table are indicated in mass %. The glasses shown in the table were melted in a quartz crucible at 1450° C. for five hours according to a fining method using NaCl that material powders of quartz sand, a carbonate, hydroxide and the like of each metal were weighed and mixed to have the individual oxide compositions shown in the table. At that time, Sn was introduced as a divalent compound such as a stannous oxide (tin (II) oxide) but indicated by converting to $SnO_2$ in the table. And, the glasses of Nos. 5 and 10 were melted with carbon in 2% at a total batch ratio mixed as the reducing agent. Then, the glasses each thoroughly stirred and made clear were flown into a rectangular frame, cooled slowly and formed into desired shapes to produce specimens in accordance with the following evaluation items.

TABLE 1

|  | Examples | | | | | | | | | | Comparative Examples | |
| --- | --- | --- | --- | --- | --- | --- | --- | --- | --- | --- | --- | --- |
|  | No. 1 | No. 2 | No. 3 | No. 4 | No. 5 | No. 6 | No. 7 | No. 8 | No. 9 | No. 10 | No. 11 | No. 12 |
| $SiO_2$ | 66.59 | 65.05 | 65.05 | 65.19 | 65.48 | 69.28 | 65.97 | 64.49 | 67.39 | 68.28 | 68.55 | 72.97 |
| $B_2O_3$ | 17.3 | 17.5 | 19 | 16.2 | 18.5 | 15.5 | 17 | 16.8 | 15 | 17.2 | 17.5 | 17 |
| $Al_2O_3$ | 3 | 3.5 | 3.5 | 2.5 | 2 | 3.5 | 4 | 3 | 2.8 | 3 | 3.5 | 3 |
| $Li_2O$ | 1 | 1 | 1.5 | 2 | 0.5 | 1 |  | 0.8 | 0.7 | 0.5 | 1 | 1 |
| $Na_2O$ | 0.5 | 0.4 | 1 | 0.5 | 1 | 0.4 | 0.7 | 2.8 | 0.4 | 3 | 0.5 | 2 |
| $K_2O$ | 7.5 | 7.7 | 7.7 | 7 | 7.2 | 5.5 | 6.5 | 3 | 7 | 1.5 | 7.9 | 3.5 |
| MgO |  |  |  |  | 0.1 |  |  |  |  |  | 1 |  |
| CaO |  |  |  |  | 0.2 | 0.1 |  |  |  |  |  |  |
| BaO |  |  |  |  |  |  |  |  | 0.1 | 2.4 |  |  |
| SrO |  |  |  |  |  |  |  |  | 0.1 |  |  |  |
| $ZrO_2$ |  | 0.1 | 0.5 | 1 | 0.5 | 0.2 |  | 2 | 1 | 0.3 |  |  |
| ZnO | 2 | 0.2 | 1 |  | 2.5 | 1 | 3 |  | 0.5 | 1.5 |  |  |
| $Nb_2O_5$ | 0.1 |  |  | 0.1 |  |  |  |  | 0.1 |  |  |  |
| $TiO_2$ |  |  |  |  |  |  |  |  |  |  |  | 0.5 |
| $Fe_2O_3$ | 0.01 | 0.05 | 0.05 | 0.01 | 0.02 | 0.02 | 0.03 | 0.01 | 0.01 | 0.02 | 0.05 | 0.03 |
| $CeO_2$ | 0.8 | 1.5 | 0.6 | 3.5 | 2 | 1 | 0.8 | 4.5 | 3 | 2.3 | 1 |  |
| $SnO + SnO_2$ ($SnO_2$ conversion) | 1.2 | 3 | 0.1 | 2.0 |  | 2.5 | 2 | 2.5 | 2.0 |  |  |  |
| Glass color | C* | C* | C* | C* | C* | C* | C* | C* | C* | C* | Y.B. | C* |
| 315 nm transmittance (%) | 3.5 | 0.2 | 8.5 | <0.1 | 0.1 | 1.6 | 3.3 | <0.1 | <0.1 | <0.1 | 2.2 | 75.0 |
| Thermal expansion coefficients ($\times 10^{-7}/°$ C.) | 49.6 | 51.8 | 52.4 | 51.2 | 50.5 | 40.1 | 40.5 | 37 | 38.5 | 40.2 | 52 | 39 |
| Degree of deterioration of transmittance (%) | 4.1 | 3.5 | 4.8 | 2.8 | 3.6 | 1.7 | 4.2 | 1.8 | 3.3 | 4.1 | 1.8 | 0.3 |

C* = Colorless
Y.B. = Yellowish brown

The items shown in the table will be described. The thermal expansion coefficients indicate the values obtained by measuring average linear expansion coefficients at 0 to 300° C. according to JIS (Japanese Industrial Standards) methods.

To evaluate the sealing property of the glass with kovar and tungsten which are electrode materials, it is desirable that the glass has a thermal expansion coefficient equal to or slightly lower than that of the electrode material metal. If a difference in thermal expansion coefficient between the glass and the electrode material becomes large, it causes a leak from the sealed portion or a crack, and the glass cannot be used for fluorescent lamps.

A degree of deterioration of transmittance by an ultraviolet solarization resistance test was determined by cutting each glass sample into a 30-mm square plate, which was optically polished of their both sides so as to prepare a specimen having a thickness of 1 mm, placing the specimen at a distance of 20 cm from a mercury lamp (H-400P) to face it, and exposing the specimen to ultraviolet radiation for 300 hours, measuring a transmittance at a wavelength of 400 nm, and indicating a degree of deterioration changed from the initial transmittance before the ultraviolet radiation. The degree of deterioration (%) is given by

[(initial transmittance−transmittance after ultraviolet radiation)/initial transmittance]×100.

Using a specimen of which both surfaces were subjected to optical polishing so to have a thickness of 0.3 mm, its transmittance of a wavelength of 315 nm was measured, and the obtained value was also indicated.

Among the individual specimens having Nos. 1 to 10 according to the examples of the present invention, Nos. 1 to 5 are complied with an average linear expansion coefficient suitable to a kovar seal, and Nos. 6 to 10 are complied with an average linear expansion coefficient suitable to a tungsten seal. Their average linear expansion coefficients have values relatively close to the average linear expansion coefficient of $55 \times 10^{-7}/°$ C. of the kovar and the average linear expansion coefficient of $45 \times 10^{-7}/°$ C. of the tungsten, and good and highly reliable sealing can be obtained. It is the reason why the glass is determined to have an average linear expansion coefficient of 36 to $57 \times 10^{-7}/°$ C. in the embodiment of the present invention.

The glass having a thickness of 0.3 mm has a transmittance of a wavelength of 315 nm which is very low in comparison with that of a conventional glass and does not substantially allow the transmission of harmful ultraviolet rays which affect the deterioration of resins. In addition, deterioration in transmittance due to ultraviolet radiation was suppressed to 5% or less and the ultraviolet solarization resistance was very high.

Meanwhile, the specimen No. 11 as a comparative example was an example of a composition not containing SnO and had a low transmittance of 315 nm and less deterioration in transmittance by ultraviolet radiation, but the glass was colored to yellowish brown. The specimen No. 12 has a low level of deterioration in transmittance by ultraviolet radiation but has high transmittance of 315 nm and cannot block ultraviolet rays of 313 nm by the glass tube, so that it has a very high possibility that deterioration of the resin parts of the back light unit is accelerated.

The glass according to one embodiment of the invention does not contain PbO which is an environmentally harmful substance, so that it has an advantage that its influence on the environment is small. The term "substantially not containing" used in the present invention means that addition is not made intentionally, and inclusion in an amount which is unavoidably mixed from the materials and the like and does not affect on the expected properties is not excluded.

INDUSTRIAL APPLICABILITY

The glass according to the present invention is suitable for a glass tube for fluorescent lamps as described above in detail and also excellent in ultraviolet blocking property, so that even when it is used for fluorescent lamps for a back light of liquid crystal displays or the like, the materials of resin parts and the like within the display device are not deteriorated, and the display quality can be prevented from being deteriorated. And, the glass of the invention is not limited to the above but can also be used for an ultraviolet blocking filter because of its excellent ultraviolet blocking property and visible light transmission property and also for an enclosure or the like of a light source involving ultraviolet radiation, such as a mercury lamp, because of its high ultraviolet solarization resistance.

What is claimed is:

1. An ultraviolet absorbing glass for fluorescent lamps used for a back light source of a display device, comprising a borosilicate glass substantially not comprising $TiO_2$ but comprising, in mass %, 0.001 to 0.05% of $Fe_2O_3$, 0.1 to 5% of $CeO_2$, 0.01 to 5% of $SnO+SnO_2$ and 0.01 to 5% of $ZrO_2+ZnO+Nb_2O_5$ and having an average linear expansion coefficient in a range of 36 to $57 \times 10^{-7}/°$ C. at 0 to 300° C. defined in JIS R 3102, and to have a transmittance of 10% or less at a wavelength of 315 nm when a thickness is 0.3 mm and a degree of deterioration of 5% or less according to the following ultraviolet radiation test, wherein the degree of deterioration according to the ultraviolet radiation test is determined by positioning a glass, of which both sides having been optically polished so at to have a mirror surface and a thickness of 1 mm, at a distance of 20 cm with the polished surface faced to a 400 W high-pressure mercury lamp having a wavelength of 253.7 nm, exposing it to ultraviolet radiation for 300 hours, measuring a transmittance ($T_1$) at a wavelength of 400 nm, and determining a degree of deterioration from an initial transmittance ($T_0$) at a wavelength of 400 nm before the ultraviolet radiation by the following equation:

the degree of deterioration (%)=$[(T_0-T_1)/T_0] \times 100$.

2. The ultraviolet absorbing glass for fluorescent lamps according to claim 1, wherein the borosilicate glass comprises, in mass% 60 to 80% of $SiO_2$, 1 to 7% of $Al_2O_3$, 10 to 25% of $B_2O_3$, 3 to 15% of $Li_2O+Na_2O+K_2O$ and 0 to 5% of $CaO+MgO+BaO+SrO$.

3. The ultraviolet absorbing glass for fluorescent lamps according to claim 1, wherein the $SnO+SnO_2$ is introduced as a divalent Sn compound and comprises 0.01 to 5% of a total amount of SnO and $SnO_2$ within the glass.

4. A glass tube for fluorescent lamps, provided by forming the ultraviolet absorbing glass for fluorescent lamps according to claim 1 into a tubular shape,
wherein the glass tube has an outside diameter of 0.7 to 6 mm and a thickness of 0.07 to 0.7 mm; and
wherein the glass tube is used for a back light source of a liquid crystal display device.

5. A method for producing an ultraviolet absorbing glass for fluorescent lamps comprising a borosilicate glass, comprising:
mixing a borosilicate glass component comprising, in mass %, 0.001 to 0.05% of $Fe_2O_3$, 0.1 to 5% of $CeO_2$, 0.01 to 5% of $SnO+SnO_2$ and 0.01 to 5% of $ZrO_2+ZnO+Nb_2O_5$, using as a glass component a divalent compound for an Sn source and substantially not comprising $TiO_2$, and reductively melting to obtain a melt; and
forming the melt into a tubular shape.

6. The method for producing an ultraviolet absorbing glass for fluorescent lamps according to claim 5, wherein the borosilicate glass component comprises 60 to 80% of $SiO_2$, 1 to 7% of $Al_2O_3$, 10 to 25% of $B_2O_3$, 3 to 15% of $Li_2O+Na_2O+K_2O$ and 0 to 5% of $CaO+MgO+BaO+SrO$.

7. The ultraviolet absorbing glass for fluorescent lamps according to claim 2, wherein the $SnO+SnO_2$ is introduced as a divalent Sn compound and comprises 0.01 to 5% of a total amount of SnO and $SnO_2$ within the glass.

8. The glass tube for fluorescent lamps, provided by forming the ultraviolet absorbing glass for fluorescent lamps according to claim 2 into a tubular shape,
wherein the glass tube has an outside diameter of 0.7 to 6 mm and a thickness of 0.07 to 0.7 mm; and
wherein the glass tube is used for a back light source of a liquid crystal display device.

9. The glass tube for fluorescent lamps, provided by forming the ultraviolet absorbing glass for fluorescent lamps according to claim 3 into a tubular shape,
wherein the glass tube has an outside diameter of 0.7 to 6 mm and a thickness of 0.07 to 0.7 mm; and
wherein the glass tube is used for a back light source of a liquid crystal display device.

10. The glass tube for fluorescent lamps, provided by forming the ultraviolet absorbing glass for fluorescent lamps according to claim 7 into a tubular shape,
wherein the glass tube has an outside diameter of 0.7 to 6 mm and a thickness of 0.07 to 0.7 mm; and
wherein the glass tube is used for a back light source of a liquid crystal display device.

* * * * *